E. S. ANDERSON.
AUTOMATIC WEIGHING MECHANISM.
APPLICATION FILED JUNE 7, 1911.

1,053,769.

Patented Feb. 18, 1913.
2 SHEETS—SHEET 1.

Witnesses
William R. Smith
R. B. Cavanagh

Inventor
Edward S. Anderson
By Victor J. Evans
Attorney

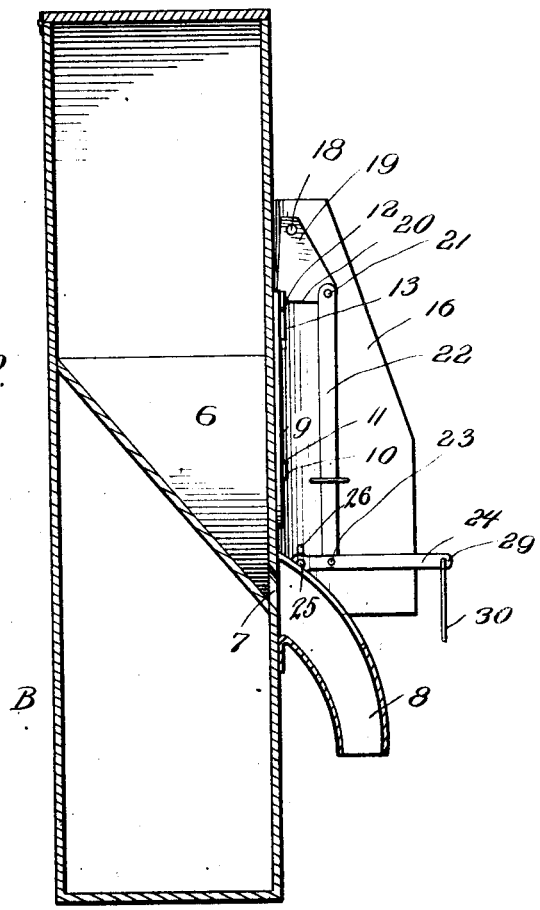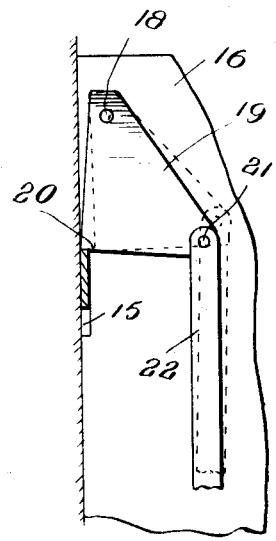

UNITED STATES PATENT OFFICE.

EDWARD S. ANDERSON, OF MABEL, MINNESOTA.

AUTOMATIC WEIGHING MECHANISM.

1,053,769. Specification of Letters Patent. Patented Feb. 18, 1913.

Application filed June 7, 1911. Serial No. 631,745.

*To all whom it may concern:*

Be it known that I, EDWARD S. ANDERSON, a citizen of the United States, residing at Mabel, in the county of Fillmore and State of Minnesota, have invented new and useful Improvements in Automatic Weighing Mechanism, of which the following is a specification.

This invention relates to certain novel and useful improvements in automatic weighing mechanism, and has particular application to an apparatus whereby the material being dispensed, such as sugar, coffee or the like is permitted to flow through a delivery chute or spout from a bin or hopper, to the scales, until the predetermined weight of material has been deposited thereon, when the flow of the material will be automatically cut off.

Still a further object of my invention is to provide a weighing mechanism adapted to control the flow of the material from the bin, the controlling means being actuated by the scales to operate a shutter or door controlling the outlet from the bin.

Another object of the invention is to provide a mechanism of the class described embodying the desired features of simplicity and durability, coupled with cheapness and efficiency in operation.

With the above-recited objects and others of a similar nature in view, the invention consists in the construction, combination and arrangement of parts, set forth in and falling within the scope of the appended claims.

Figure 1:
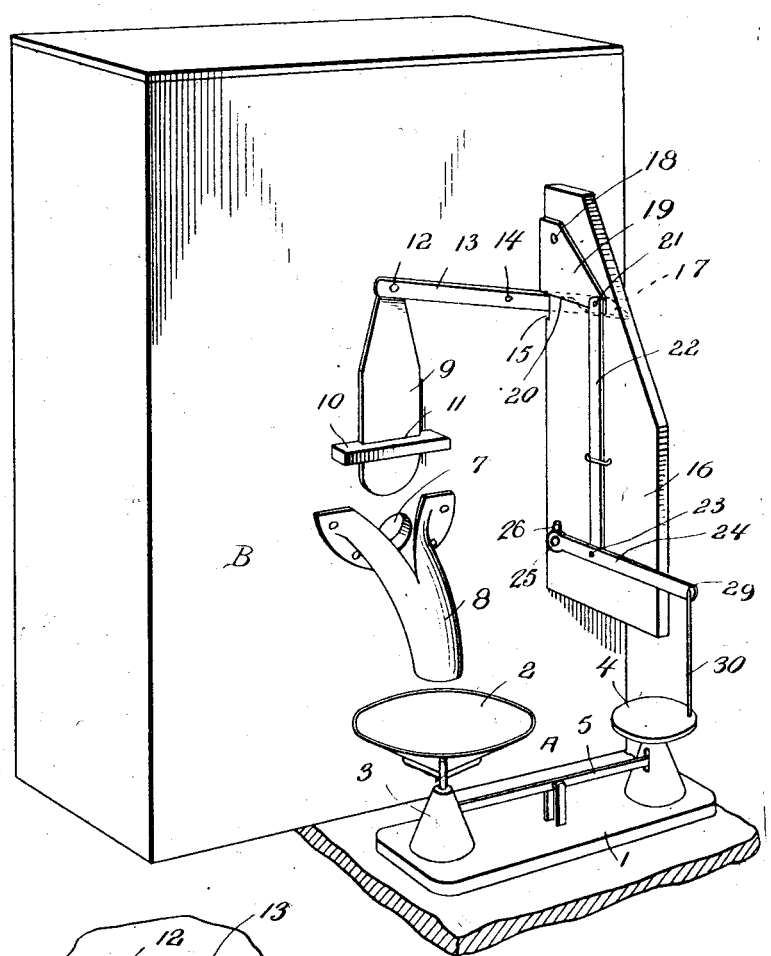
Figure 4:
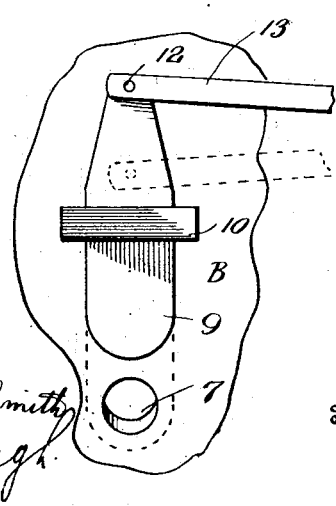
Figure 5:
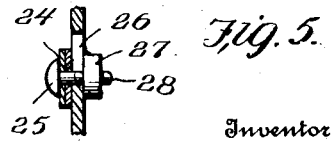

In the accompanying drawings:—Figure 1 is a perspective view of the automatic weighing mechanism embodying my invention, showing the scales, the containing bin and the automatic cut-off for the latter operated from the scale. Fig. 2 is a vertical sectional view, taken through the hopper and cut-off mechanism therefor. Fig. 3 is a detail plan view of the latching plate and the tripping mechanism therefor. Fig. 4 is a similar view of the cut off mechanism. Fig. 5 is a vertical sectional view of a detail of the invention, parts being shown in elevation.

Referring now to the accompanying drawings in detail, the letter A designates a pair of scales, which are herein shown conventionally and in which 1 indicates the platform or base, 2 the scoop thereon, 3 the pan post, 4 the pan, and 5 the scale beam. This scale is adapted to be mounted below and adjacent to the bin or other receptacle B, which is provided with an inclined or hopper-shaped bottom 6, the sides of which converge to the outlet 7. Arranged at the outlet is the downwardly extending chute or spout 8, which is designed to deliver the material to the receiving scoop or other device upon the scale. The outlet 7 is adapted to be controlled by the sliding plate 9 vertically arranged relative to the front of the bin, said plate being guided by the guide strip or bar 10, secured to the front of the bin and having a recess 11 for permitting the passage of the shutter. To the upper end of the shutter is pivotally connected as at 12 the arm 13 fulcrumed at 14 to the front of the bin, said arm extending through a slot 15 in the forwardly projecting support 16 connected to the bin, the end of the arm having a projecting lip 17 forming a convenient handle for actuating the arm to elevate the shutter and uncover the outlet. Pivotally connected at 18 to the inner side of the wall 16 is a latching plate 19 preferably triangular in form, the end 20 of which is designed to engage with the top of the arm 13, when the latter is in position to elevate the shutter. To the outer end of the latching plate is pivotally connected at 21 the upper end of the link arm 22, the lower end of said arm being pivoted at 23 to the lever 24, said latter being fulcrumed upon the stud shafts 25 adjustably arranged in the slotted portion 26 of the wall, said stud being held in any position of vertical adjustment in the slot by means of the thumb screw 27 screwed onto the threaded end 28 of the stud. The free end 29 of the lever is designed to be connected by a link or the like 30, to the pan 4 of the scale.

From the above description, taken in connection with the accompanying drawings, the construction and operation of my invention will be readily apparent. When it is desired to weigh out a determined quantity of material, the proper weights are placed upon the scale, and the shutter is then elevated by depressing the end of the arm having the lip or handle, and the material flows onto the scales. As the predetermined weight is reached, the scale pan rises and in doing so actuates the lever 24 and the latter through the link arm 22 moves the locking plate 19 outward on its pivot away from locking position in contact with the upper edge of the arm 13, thereby releasing said arm, and permitting the shutter to drop thus cutting off the flow of material from the bin to the spout.

It will be noted that I have provided a simple yet effective means for controlling the amount of material to be weighed out, and as the device is automatic in its operation, and is dependent upon the individual attention of a clerk or the like, the liability of merchants losing through overweight is obviated, and at the same time the proper amount of material is delivered to the scales.

While I have herein shown and described my invention as employed in connection with one type of scale I wish it to be understood that it is not limited in its useful application to this particular scale, as it may be operated in connection with other forms of weighing devices, and furthermore, I do not limit myself to the precise details of construction herein set forth, as modification and variation may be made without departing from the spirit of the invention or exceeding the scope of the appended claims.

I claim:—

1. The combination with a material-containing bin having an outlet and weighing scales arranged adjacent thereto, of a spout connected to the outlet of the bin and extending over the weighing scales, a movable shutter controlling the flow of material through the outlet, a pivoted arm connected to said shutter, a latch arranged at an angle to said arm and adapted to hold the shutter in open position, and connections between said scale and latch for actuating the latch upon the upward movement of the connected portion of the scale to release the arm and permit the closing of the shutter.

2. The combination with a bin having an outlet and weighing scales arranged adjacent thereto, of a spout at the outlet of the bin for depositing material upon the scale, a shutter for the outlet comprising a vertical movable plate, an arm pivoted at one end to said plate and fulcrumed intermediate its length to the bin, a latch comprising a plate member having one edge adapted to engage with the arm to hold the shutter in elevated position, a link arm connected to said latch plate, a lever fulcrumed at one end and connected to said link arm, and connections between the opposite ends of the lever and the scale.

3. The combination with a bin having an outlet and weighing scales arranged adjacent thereto, of a spout at the outlet of the bin for delivering material to the scale, a shutter for the outlet comprising a vertically movable plate, an arm connected at one end to said plate and pivoted intermediate its length to the bin, the opposite end of said arm having a lip or extension by which the arm may be moved to elevate the shutter, a latching plate adapted to engage with the arm, a support arranged at an angle to the bin wall and to which the latching plate is pivoted, a link connected at one end to the latching plate, a lever fulcrumed to the angular wall and to which the opposite end of the link is connected, and a connection between said lever and the scales.

In testimony whereof I affix my signature in presence of two witnesses.

EDWARD S. ANDERSON.

Witnesses:
T. A. JOHNSON,
E. M. NELSON.